United States Patent
Gu et al.

(10) Patent No.: US 10,694,749 B2
(45) Date of Patent: Jun. 30, 2020

(54) INSECTICIDE FORMULATION

(71) Applicant: Wellmark International, Schaumburg, IL (US)

(72) Inventors: George Gu, Dallas, TX (US); Keith Haas, Dallas, TX (US); Jeanne Witte, Dallas, TX (US)

(73) Assignee: Wellmark International, Schaumburg, IL (US)

( * ) Notice: Subject to any disclaimer, the term of this patent is extended or adjusted under 35 U.S.C. 154(b) by 0 days.

(21) Appl. No.: 15/622,242

(22) Filed: Jun. 14, 2017

(65) Prior Publication Data

US 2017/0360047 A1    Dec. 21, 2017

Related U.S. Application Data

(60) Provisional application No. 62/352,948, filed on Jun. 21, 2016.

(51) Int. Cl.

| | | |
|---|---|---|
| *A01N 63/00* | (2020.01) | |
| *A01N 49/00* | (2006.01) | |
| *A01N 25/10* | (2006.01) | |
| *A01N 25/12* | (2006.01) | |
| *A01N 37/36* | (2006.01) | |

(52) U.S. Cl.
CPC .............. *A01N 63/00* (2013.01); *A01N 25/10* (2013.01); *A01N 25/12* (2013.01); *A01N 37/36* (2013.01); *A01N 49/00* (2013.01)

(58) Field of Classification Search
None
See application file for complete search history.

(56) References Cited

U.S. PATENT DOCUMENTS

| | | | |
|---|---|---|---|
| 4,631,857 A | | 12/1986 | Kase et al. |
| 5,484,600 A | * | 1/1996 | Sjogren ............... A01N 25/12 424/405 |
| 5,902,596 A | * | 5/1999 | Levy ................... A01N 25/10 424/405 |
| 7,892,571 B2 | * | 2/2011 | Sjogren ............... A01N 49/00 424/404 |
| 8,187,618 B2 | | 5/2012 | Sjogren et al. |
| 2004/0185079 A1 | | 9/2004 | Zomer |
| 2006/0165745 A1 | * | 7/2006 | Chew .................. A01N 25/12 424/405 |
| 2006/0188535 A1 | | 8/2006 | Sjogren et al. |

FOREIGN PATENT DOCUMENTS

| | | |
|---|---|---|
| DE | 100 62 780 | 7/2002 |
| EP | 0 349 769 A1 | 1/1990 |
| EP | 0 454 485 A2 | 10/1991 |
| WO | 02/087342 | 11/2002 |
| WO | 2017/222885 | 12/2017 |

OTHER PUBLICATIONS

PCT Application No. PCT/US2017/037413, International Search Report and Written Opinion, dated Aug. 16, 2017, 7 pages.
Micucci, "The Effectiveness of Methoprene for Controlling Mosquito Population in Ontario That Can Carry West Nile Virus," Effective Public Health Practice Project, Jul. 2004 pp. 1, 4-6, 14-16, 33.
EP Application No. 17815948.9, Extended European Search Report, dated Nov. 18, 2019, 8 pages.

* cited by examiner

*Primary Examiner* — Vera Afremova
(74) *Attorney, Agent, or Firm* — Kilpatrick Townsend & Stockton LLP

(57) ABSTRACT

The present invention provides an insecticide formulation, the insecticide formulation comprising a *Bacillus thuringiensis* (BT) strain; a floating agent and a disintegration agent bound on a substrate. The substrate has a density greater than 1.

18 Claims, 2 Drawing Sheets

INSECTICIDE FORMULATION

CROSS-REFERENCE TO RELATED APPLICATIONS

This application claims priority to U.S. Provisional Application No. 62/352,948, filed Jun. 21, 2016, the teaching of which are hereby incorporated by reference in its entirety for all purposes.

BACKGROUND OF THE INVENTION

An aquatic environment provides mosquitoes with a place to lay eggs, grow and develop through their eggs, larvae and pupal stages. Mosquitoes prefer stagnant water as a locus to lay their eggs. They commonly infest small bodies of water including ponds, stagnant creek areas, marshes, drain ditches, swamps and other wetland habitats. Many species of mosquitoes use containers of water as egg-deposit sites. Adults emerge from pupal cells, fly, rest then feed, mate, lay eggs, and may feed again (depending on group); oviposition is part of the airborne portion of their lifecycle. Water habitat is an excellent locus because that is where the larvae must reside, and certain insecticides kill the larvae and pupae, not the adults.

However, a problem encountered in delivering an insecticide to an aquatic environment is that the aquatic organism to be treated is not susceptible to contacting bioactive material. This is primarily because of the pest's location in a column of water either at the surface, the bottom, or some intermediate region in between may not contact the pesticide. Because of the difference in densities of the insecticide and the location of the pest, it cannot be targeted to precisely treat the pest organisms of interest in the water column. Depending of the location of the pest organism, it would be advantageous to target the column of water where the organism resides. If the pest organism is at the bottom, the surface or an intermediate layer in the water column, it would be advantageous to target that specific area of the pest's location.

Prior art products are too light and float on the surface of the water while drifting with wind (density less than 1). Further, light products may drift in the air and not apply as well to targeted locations, and may hang up in vegetation more easily because of their low specific gravity. Alternatively, products which are too heavy, sink (density greater than 1), and do not release the insecticide fast enough to be effective.

*Bacillus thuringiensis israelensis* (BTI) is an extensively used mosquito larvicide, which bacteria produces a toxic crystal glycoprotein (protoxin). BTI toxins have been used in the control a broad range of mosquito and blackfly species as well as nematodes mite and protozoa. Another potential microbial insecticide, *Bacillus sphaericus*, is known to be effective against *Culex* spp. and *Anopheles* spp. species, and has better residual activity in polluted waters by production of binary toxin (Bin) and mosquitocidal toxins (Mtx).

EP0349769 discloses *Bacillus sphaericus* bacteria genetically engineered with toxin producing genes taken from *Bacillus thuringiensis israelensis* (BTI) bacteria and transferred to *Bacillus sphaericus* strains. The genetically modified *Bacillus sphaericus* strains produced are capable of producing BTI toxins in effective amounts and can control against mosquito larvae and black flies effectively.

EP0454485 discloses using insecticide toxins obtained from *Bacillus thuringiensis* or *Bacillus sphaericus* bacteria against pests living in water such as mosquito larvae. The spores of these bacteria kill insect larvae feeding on these spores. The spores are digested in intestines of the larvae and release their toxins and neutralize the larvae.

Methoprene is an insect growth regulator and specifically a juvenile hormone analog which acts as a growth regulator when used as an insecticide. Methoprene mimics natural juvenile hormone and as juvenile hormone must be absent for a pupa to molt to an adult, methoprene-treated larvae are unable to successfully change from pupae to adults. U.S. Pat. No. 7,892,571 discloses a slow release carbon and S-methoprene composition as a solid flowable particulate for mosquito control. The slow release composition is contacted with water and slowly releases the S-methoprene directly into the aqueous locus.

In view of the foregoing, there is a need in the art to target aquatic pests that are resident in various locations within the water column. The present invention satisfies this and other needs.

BRIEF SUMMARY OF THE INVENTION

In one embodiment, the present invention provides an insecticide formulation, the insecticide formulation comprising, consisting essentially of, or consisting of a *Bacillus thuringiensis* (BT) strain; a floating agent and a disintegration agent bound on a substrate. Preferably, the substrate is denser than water causing the granule to sink to the bottom of the water column before releasing the BT. Advantageously, the formulation releases BT into the entire water column and immediately releases BT upon application. The *Bacillus thuringiensis* (BT) strain can be a genetically modified *Bacillus* strain containing a BT gene.

In another embodiment, the present invention provides a method for controlling insects, the method comprising, consisting essentially of, or consisting of: contacting an insect habitat, breeding grounds or their locus with an insecticide formulation comprising: a *Bacillus thuringiensis* (BT) strain; a floating agent and a disintegration agent bound on a substrate, wherein the insecticide formulation controls insects. As the substrate is dense, the granule sinks in the water column and then releases the BT back through the water column to the surface.

These and other aspects, objects and embodiments will become more apparent when read with the detailed description and figures which follow.

BRIEF DESCRIPTION OF THE DRAWINGS

FIG. 2A shows a formulation at $t_1$; FIG. 2B shows a formulation at $t_2$; and FIG. 2C shows a formulation at $t_3$.

DETAILED DESCRIPTION OF THE INVENTION

I. Definitions

Figure 1:
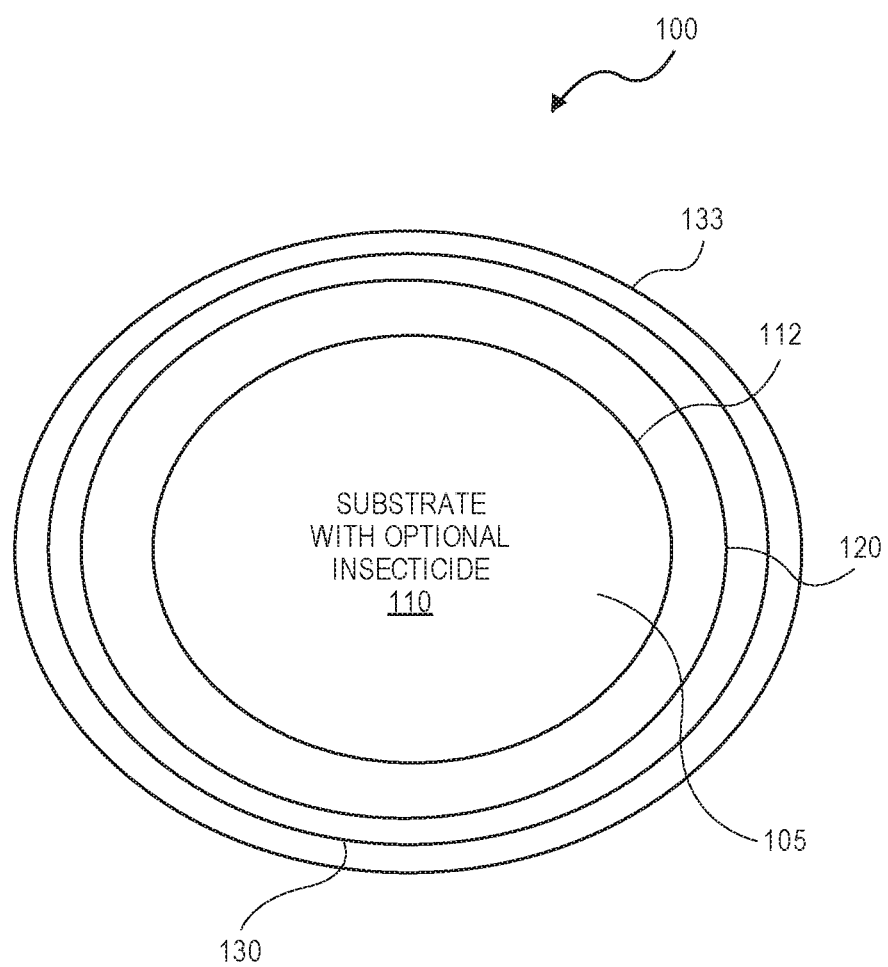
FIG. 1 illustrates one embodiment of the formulation of the present invention.
Figure 2A:
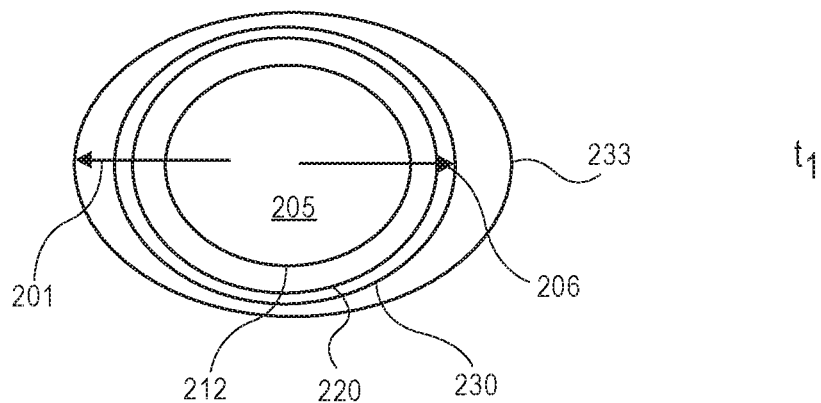
FIGS. 2A-C illustrates one embodiment of the formulation in operation in an aquatic environment.
Figure 2B:
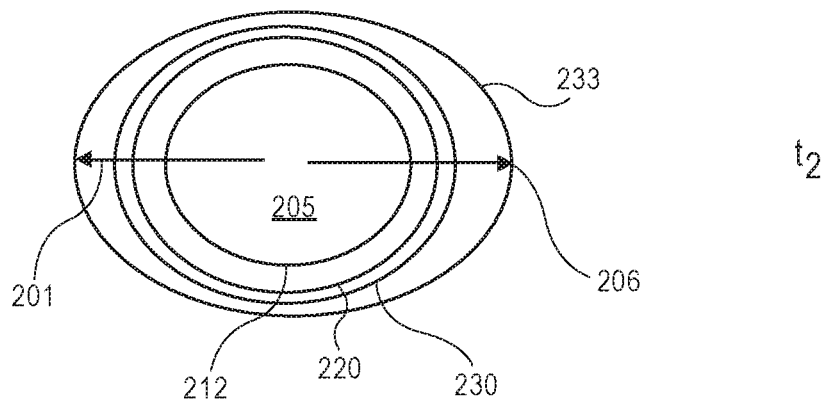
Figure 2C:
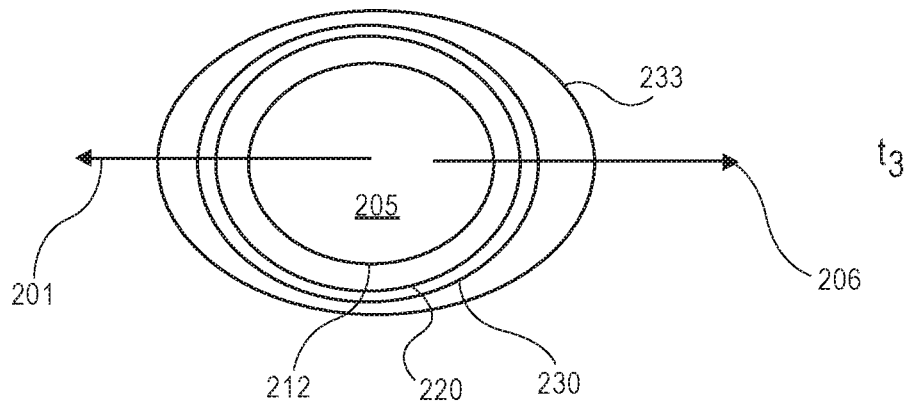

The terms "a," "an," or "the" as used herein not only include aspects with one member, but also include aspects with more than one member. For example, an embodiment including "a binding agent" should be understood to present certain aspects with one or more binding agents.

"About" as used herein applies to a defined range around a numerical value. When "X" is a numerical value, "about X," generally indicates a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to imply and provide written description support for a claim limitation of, e.g., "0.98X." However, when the quantity measured in "X" only includes whole integer values (e.g., "X carbons"), "about X" indicates from (X−1) to (X+1). In this case, "about X" as used herein specifically indicates at least the values X, X−1, and X+1. When "about" is applied to the beginning of a numerical range, it applies to both ends of the range. Thus, "from about 5 to 20%" is equivalent to "from about 5% to about 20%" (and vice versa). When "about" is applied to the first value of a set of values, it applies to all values in that set. Thus, "about 7, 9, or 11%" is equivalent to "about 7%, about 9%, or about 11%."

The term "density" is weight per unit volume. The density of water is the weight of the water per its unit volume. The value used herein is 1 gram per milliliter or 1 gram per cubic centimeter.

The term "w/w" or "wt/wt" means a percentage expressed in terms of the weight of the ingredient or agent over the total weight of the composition multiplied by 100.

II. Embodiments

The present invention provides an insecticide formulation comprising a mixture of a floating agent, BT powder and a disintegrating agent coated on a substrate such as a granule. Advantageously, the substrate has a density high enough to sink in water (greater than 1). When the formulation is immersed in an aqueous environment, the disintegrating agent swells, which provides the force for the coating to detach from granules. The floating agent bound with BT then floats in the water column. After the binding agent dissolves in water, BT is released in into water column, rising to the surface. In certain aspects, the present formulation has a density greater than 1, but after detachment of the floating agent, the density decreases and the active ingredient travels up through the water column to the surface.

Advantageously, the insecticide formulation in an aquatic environment releases BT in a water column and that portion of the formulation floats to the surface. The releasing BT portion of the formulation as it rises to the surface is immediately efficacious against pests. In certain instances, the substrate has a second pesticide (e.g., methoprene), which portion is released more slowly over time.

In one embodiment, the present invention provides an insecticide formulation, the insecticide formulation comprising:

a *Bacillus thuringiensis* (BT) strain; a floating agent and a disintegration agent bound on a substrate.

In certain instances, the insecticide formulation contains a BT strain, which strain is *Bacillus thuringiensis* var *israelensis* (BTI). In certain instances, the BT strain is a genetically modified *Bacillus* containing a BTI gene. In some instances, the BT strain is present as a powder in the formulation, such as a dry powder. The amount of BT is between about 2% to about 15% w/w of the formulation. The amount of BT can be about 2% to about 7%, or about 3% to about 10%, or about 5% to 12%, or about 5 to about 8% w/w or about 2, 3, 4, 5, 6, 7, 8, 9, 10, 11, 12, 13, 14 or about 15% of the weight of the formulation.

In certain instances, the BT strain, the floating agent and the disintegration agent form an admixture. In some instances, the admixture is bound to the substrate. In some instances, the admixture and the substrate have an affinity for each other and the admixture adheres to the substrate.

In one aspect, the formulation of the present invention provides a bacterial insecticide effective against mosquito larvae, which bacterial insecticide is *Bacillus thuringiensis israelensis*. *Bacillus thuringiensis israelensis* (BTI) is a bacterium, i.e., a microorganism, ingested in particular by mosquito larvae during feeding. For use, BTI in the form of e.g. a powder or a liquid can be used. BTI bacteria contain a special protein crystal that is extremely toxic to larvae. The first larvae die as early as 15-20 minutes after ingesting the bacteria. In certain other aspects, the bacterial insecticide can be *Bacillus sphaericus*, or a genetic modification thereof.

In other instances, the admixture is bound to the substrate with a binding agent. Various binding agents are suitable for use in the present invention. For example, in a preferred embodiment, the binding agent is a water soluble polymer. Suitable water soluble polymers include polyvinyl alcohol, polyethylene oxide or gelatin. Those of skill in the art will know of other binding agents suitable for use in the present invention.

In certain instances, the formulations of the present invention comprise a floating agent. The floating agent allows the formulation to float in a water column. Suitable floating agents include, but are not limited to, perlite, vermiculite, a synthetic polymer and combinations thereof. In certain instances, the synthetic polymer is polypropylene or polyethylene polymers.

Typically, the floating agent is present in an amount of between 5% to 30% w/w, or about 8% to about 25%, or about 12% to about 20%, or about 8-11% w/w or about 5, 6, 7, 8, 9, 10, 11, 12, 13, 14, 15, 16, 17, 18, 19, 20, 21, 22, 23, 24, 25, 26, 27, 28, 29 or 30% w/w.

In one embodiment, the substrate is a granule, such as a high density granule. The high density granule can be sand, a resin, a pellet, clay, iron, stone, a mineral, quartz, slate or other materials with some weight associated with it and a density greater than 1. For example, the substrate can comprise about 50-90% w/w of the total weight of the formulation. For example, the substrate can be 50, 55, 60, 65, 70, 75, 80, 85, or 90% w/w of the formulation. In certain instances, a second insecticide is associated with the granule. In a preferred embodiment, methoprene is a second insecticide.

Various disintegration agents are suitable for the present invention. Disintegration agents include, but are not limited to, a cross-linked cellulose, a cross-linked PVP, a cross-linked starch, a cross-linked alginic acid, a xanthan gum and a gellan gum.

In certain instances, the insecticide formulation of the present invention comprises a disintegration agent, which is present in an amount of about 0.5% to 5% w/w, or about 1.5 to 3% w/w or about 0.5, 1, 2, 3, 4, or 5% w/w.

In addition to BT, in certain instances, a second insecticide can be used. In one aspect, the insecticide used in combination with BT is an insect growth regulator (IGR). Insect growth regulators (including juvenile hormones) are well known for their use and efficacy in controlling or eliminating insect infestation in farm, ranch, residential and industrial environments. Many types of insects are controllable by insect growth regulators, including flies (e.g., face flies, house flies, stable flies and horn flies), fleas, mosquitoes, flour beetles, cigarette beetles, and cockroaches. The regulators vary widely in chemical composition, and two of the more prominent classes are 2,4-dienoic acids and phenoxyphenoxy compounds, particularly phenoxyphenoxyalkoxyheterocyclics, as well as benzoylureas and triazine derivatives. Examples of 2,4-dienoic acids and related compounds are methoprene, hydroprene, neotenin, and epiphenonane. As used herein, "methoprene" includes R-methoprene, S-methoprene and mixtures of R and S methoprene at all percentages of either isomer. S-methoprene is the preferred methoprene. Examples of phenoxyphenoxy compounds are fenoxycarb and pyriproxyfen. Examples of benzoylureas are lufenuron, diflubenzuron, terflubenzuron, triflumaron, hexaflumaron, and flucycloxuron. An example of a triazine derivative is 2-cyclopropylamino-4,6-bis(dimethylamino)-s-triazine.

The following IGRs are suitable for the present invention. Chitin synthesis inhibitors are suitable such as bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, and triflumuron. In addition, juvenile hormone mimics are suitable such as epofenonane, fenoxycarb, hydroprene, kinoprene, methoprene, pyriproxyfen, and triprene. Further, juvenile hormones are suitable such as juvenile hormone I, juvenile hormone II, and juvenile hormone III. Other suitable IGRs include, molting hormone agonists, chromafenozide, halofenozide, and methoxyfenozide tebufenozide. Moreover, molting hormones such as α-ecdysone, and ecdysterone are suitable. In addition, molting inhibitors such as diofenolan and other IGRs, which include precocenes, such as precocene I, precocene II, and precocene III are suitable. Finally, unclassified insect growth regulators are suitable such as dicyclanil. Preferred IGRs include methoprene, hydroprene, kinoprene, fenoxycarb, pyriproxifen, and mixtures thereof.

In certain instances, the insecticide formulation of the present invention comprises about 1% to about 10% w/w of a second insecticide. In certain instances, the insecticide formulation of the present invention comprises about 1% to about 5% w/w of the second insecticide. For example, the second insecticide is about 1, 2, 3, 4 or 5% w/w of the formulation.

In certain instances, the formulation contains other excipients and components such as mineral, vegetable oil, surfactants, additives and combinations thereof. In one instance, the excipient can be immiscible in water. For example, mineral oil is immiscible in water and aids in the formulation floating.

III. Methods of Making

In one embodiment, the insecticide formulation of the present invention is made or produced by coating a substrate with a binding agent. The substrate can be a granule such as a granule having a density greater than 1. The substrate can be sand, a resin, a pellet, clay, iron, stone, a mineral, quartz, slate or other suitable material. The substrate optionally has an insecticide adsorbed thereon.

In one aspect, the binding agent such as a water soluble polymer coats the substrate and thereafter, a disintegration agent is applied. Disintegration agents include, but are not limited to, a cross-linked cellulose, a cross-linked PVP, a cross-linked starch, a cross-linked alginic acid, a xanthan gum or a gellan gum. After the disintegration agent is applied, a floating agent can coat the disintegration agent. In certain instances, the disintegration agent and floating agent are premixed at various ratios such as 1:1 ratio to form an admixture, and the admixture is applied. Suitable floating agents include, but are not limited to, perlite, vermiculite, a synthetic polymer and combinations thereof. In certain instances, the admixture can be applied multiple times, such as 2, 3, 4, 5, or 6 times.

In certain aspects, the disintegration agent and floating agent individual layering can be repeated several times, such as one or more times. For example, successive layers of disintegration agent then floating agent layer, then disintegration agent then floating agent layer in repeating cycles are used. Alternatively, the admixture can be repeatedly applied. This repetitive layering or admixture layers can occur between 2-10 times, such as 2, 3, 4, 5, 6, 7, 8, 9 or 10 times.

In certain aspects, after the repetitive layering of the disintegration agent and floating agent is applied, a binding agent is thereafter applied. Next, an admixture of BTI powder and floating agent is repetitively applied. The BTI powder and floating agent can be in a 1:1 ratio. This repetitive layering of an admixture of BTI powder and floating agent, which can be in a 1:1 ratio, can occur between 2-10 times, such as 2, 3, 4, 5, 6, 7, 8, 9 or 10 times. A binding agent final film coat can then be applied.

In one aspect, a binding agent (polyvinyl alcohol) is sprayed onto a substrate. Next, an admixture of disintegrating agent and floating agent (1:1) is applied three times. Thereafter, another polyvinyl alcohol layer is applied. Next, an admixture of BTI powder and floating agent (1:1) is applied 5 times. Finally, a polyvinyl alcohol (PVA) solution is applied as a final coat. When this outer coat is dry, the granules are covered with a PVA film, which is a dust free product.

As shown in FIG. 1, the present invention provides an insecticide formulation 100 comprising a substrate 105 with an optional insecticide 110 adhered thereto and a binding agent 112 coating the substrate. The insecticide formulation 100 includes at least a first disintegration agent 120 layer and a first floating agent 130 layered on the substrate. There can be 2 to 10 additional successive individual layers of disintegration agent layer then floating agent layer in a repeating fashion. For example, in certain instances, there can be a first disintegration agent layer and then a first floating agent layer. Next, there can be a second disintegration agent layer (on top of the first floating agent layer) and then a second floating agent layer. Next, there can be a third disintegration agent layer (on top of the second floating agent layer) and then a third floating agent layer, and so on up to 10 or more individual layers. Alternatively, in certain instances, the disintegration agent and floating agent are premixed at various ratios such as 1:1 ratio to form an admixture, and the admixture is applied. The admixture can be applied or sprayed up to 10 or more individual layers. Another binding agent layer is then applied. Thereafter, an admixture of BTI powder and floating agent is repetitively applied. The BTI powder and floating agent can be in a 1:1 ratio. This repetitive layering of an admixture of BTI powder and floating agent layering 133 can be applied multiple times such as 2 to about 10 times.

The insecticide formulation of the present invention has a density high enough to sink in water. When the formulation is immersed in water, the disintegrating agent swells and provides the swelling force, which detaches the coating(s) from granules. The floating agent, with the bound BT thereto floats in a water column. After the binding agent dissolves in water, BT will be release into the water column for immediate efficacy.

Turning now to FIGS. 2A-2C, these figures show one embodiment of the insecticide formulation of the present invention in operation. FIG. 2A shows the formulation being initially immersed in water at time $t_1$. At $t_1$, the binding agent 212 begins to solubilize and the disintegration agent 220 and floating agent 230 begin to detach from the substrate 205. The left arrow 201 and right arrow 206 show swelling. At $t_2$, the detachment of the floating agent 230 becomes more pronounced with swelling pressure, which is depicted by the left and right arrows 201, 206 being elongated. At $t_3$, the left and right arrows (201, 206) become longer with the disintegration agent 220 being more solubilized and the floating agent 230 and BT 233 detaching and rising in the water column. Next, the BT floats to the surface for immediate kill. A second insecticide (e.g., methoprene) if present, has longer lasting kill.

IV. Methods of Using

In one embodiment, the present invention provides a method for controlling insects, the method comprising: contacting an insect habitat, breeding grounds or their locus with an insecticide formulation comprising: a *Bacillus thuringiensis* (BT) strain; a floating agent and a disintegration agent bound on a substrate, wherein the insecticide formulation controls insects.

In certain instances, the insect is a mosquito.

In certain instances, the insect habitat is water.

In certain instances, the insecticide formulation is applied at about 5 lbs to about 10 lbs per/acre. In certain instances, the insecticide formulation is applied at about 7.5 lbs per/acre.

Protection can be maintained for about 5 to 30 days and for as long as 150 days or more.

Commonly, the application spacing of the formulation at the breeding site can be about 1 to 30 feet between formulation deposit sites, preferably about 5 to 25 feet, and more preferably about 7 to 12 feet. The insecticide formulation of the present invention can be distributed into the environment by hand, from ground vehicles, boats, by helicopter, aircraft, drones, or by any other means insuring distribution of the insecticide formulation into the environment. The insecticide formulation of the invention can be distributed into any environmental location which is seasonally flooded or contains standing water during a substantial portion of the season. Typical wetland areas which can be treated using the formulations of the invention are seasonally flooded basin or flat sites typical of woodland areas having few aquatic plants or grasses. Such sites generally are flooded during the wetter periods of the temperate season. The formulations can also be used in any of a variety of other wetland areas such as, for example, inland fresh meadow areas that contain standing water for greater periods of time during the year and are commonly characterized by the presence of reeds, canary grass, or other plants common in a wetter environment; inland shallow fresh water marshes that are commonly muddy throughout the growing season with about 6 inches of water, commonly characterized by the presence of cattail ranks and grass across geographically depressed areas; inland deep water, fresh water marshes that commonly have water all year round, with pockets of open water permitting submerged aquatic plants to grow, and can have as much as six inches to three feet of water permanently present; inland open fresh water such as game lakes that commonly have fresh water present at depths of greater than 10 feet, and can be characterized by depths free of vegetation, while vegetation is commonly present in the shallows or at the water edge. The formulations can be used in any of the above wetland areas in order to control pest populations.

The following examples are offered to illustrate, but not to limit, the claimed invention.

V. Examples

1. Example 1A

Example 1A below sets forth a formulation having BT. The BTI is present at about 7.3% w/w. A second insecticide (methopene) is present at about 3%.

| Ingredient | description | GG519-8E |
| --- | --- | --- |
| Silcel | floating agent | 10.97% |
| Kelzan-S | disintegration agent | 2.61% |
| BTI tech powder | Bacterial powder | 7.29% |
| Methoprene granule-1 | | 75.67% |
| Sand granules | | 0.00% |
| Methoprene granule-2 | | 0.00% |
| Methoprene granule-3 | | 0.00% |
| Mineral oil | | 1.79% |
| PVA-10% (519-13) | water soluble polymer | 1.67% |
| | | 100.00% |

Example 1B below sets forth a formulation having BT. The BTI is present at about 7 w/w, whereas the methoprene on sand granules is present at about 3%.

| Ingredient | description | GG519-130A |
| --- | --- | --- |
| Silcel | floating agent | 9.00% |
| Kelzan-S | disintegration agent | 2.00% |
| BTI tech powder | Bacterial powder | 7.00% |
| Methoprene granule-1 | | 0.00% |
| Sand granules | | 80.70% |
| Methoprene granule-2 | | 0.00% |
| Methoprene granule-3 | | 0.00% |
| Mineral oil | | 0.00% |
| PVA-10% (519-13) | water soluble polymer | 1.30% |
| | | 100.00% |

The formulations are effective against mosquitoes.

2. Example 2

Example 2A below sets forth a formulation having BT. Methoprene is present on granule-2. The BTI is present at about 7% w/w, whereas the methoprene is present at about 3% w/w.

| Ingredient | description | GG519-158B |
| --- | --- | --- |
| Silcel | floating agent | 9.00% |
| Kelzan-S | disintegration agent | 2.00% |
| BTI tech powder | Bacterial powder | 7.00% |
| Methoprene granule-1 | | 0.00% |
| Sand granules | | 0.00% |
| Methoprene granule-2 | | 80.70% |
| Methoprene granule-3 | | 0.00% |
| Mineral oil | | 0.00% |
| PVA-10% (519-13) | water soluble polymer | 1.30% |
| | | 100.00% |

Example 2B below sets forth a formulation having BT and a second insecticide is also present (e.g. methoprene). The BTI is present at about 7% w/w, whereas the methoprene is present at about 3% w/w.

| Ingredient | description | G519-155C |
|---|---|---|
| Silcel | floating agent | 9.00% |
| kelzan-S | disintegration agent | 2.00% |
| BTI tech powder | Bacterial powder | 7.00% |
| Methoprene granule-1 | | 0.00% |
| Sand granules | | 0.00% |
| Methoprene granule-2 | | 0.00% |
| Methoprene granule-3 | | 80.70% |
| Mineral oil | | 0.00% |
| PVA-10% (519-13) | water soluble polymer | 1.30% |

Example 3

Example 3 is a comparative example that shows the inventive formulations are superior to the comparator.

| Mosquito Larvae Mortality | | | | |
|---|---|---|---|---|
| Sample | Rate | 24 hour Mortality % | 48 hour Mortality % | 72 hour Mortality % |
| GG519-8F (comparative) | 7.5 lb/acre | 0 | 0 | 2 |
| GG519-8E (inventive)* | 7.5 lb/acre | 76 | 96 | 100 |
| GG519-130A (inventive)* | 7.5 lb/acre | — | — | 98 |
| GG519-155C (inventive)* | 7.5 lb/acre | 98 | 100 | 100 |
| GG519-158B (inventive)* | 7.5 lb/acre | 96 | 100 | 100 |
| Vecto Prime (comparative) | 7.5 lb/acre | 74 | 81 | 89 |
| Vecto Bac GR (comparative) | 7.5 lb/acre | 53 | 98 | 100 |
| Vecto Bac GS (comparative) | 7.5 lb/acre | 92 | 98 | 100 |

GG519-8F is a comparative formulation comprising methoprene granules which shows no killing in the first 72 hour.

GG519-130A is a BTI-sand granule, which has no methoprene.

Three vecto products are commercially available floating formulations.

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An insecticide formulation, the insecticide formulation comprising:
   a first layer having a first floating agent and a disintegration agent bound on a substrate with a first binding agent, wherein the first floating agent and the disintegration agent are admixed, wherein the substrate has a density greater than 1, the substrate having a first insecticide bound thereto, wherein the first insecticide is methoprene;
   a binding layer comprising a second binding agent, the second binding layer disposed on the first layer, wherein the first and second binding agents are the same; and
   a second layer having a second insecticide selected from the group consisting of a genetically modified *Bacillus thuringiensis* (BT) strain or genetically modified *Bacillus sphaericus*, together with a second floating agent, wherein the second layer is disposed on the binding layer and the first and the second floating agents are the same.

2. The insecticide formulation of claim 1, wherein the BT strain is *Bacillus thuringiensis* var *israelensis* (BTI).

3. The insecticide formulation of claim 1, wherein the BT strain is present in an amount of between about 2% to about 15% w/w.

4. The insecticide formulation of claim 1, wherein the first and second floating agent are each a member selected from the group consisting of perlite, vermiculite, and a synthetic polymer powder.

5. The insecticide formulation of claim 4, wherein the synthetic polymer powder is a member selected from group consisting of polypropylene and polyethylene.

6. The insecticide formulation of claim 1, wherein the first and second floating agent are present in an amount of between 5% to 30% w/w.

7. The insecticide formulation of claim 1, wherein the first and second binding agent are each a water soluble polymer.

8. The insecticide formulation of claim 7, wherein the water soluble polymer is a member selected from the group consisting of polyvinyl alcohol, polyethylene oxide and gelatin.

9. The insecticide formulation of claim 1, wherein the substrate is a granule.

10. The insecticide formulation of claim 9, wherein the granule is a high density granule.

11. The insecticide formulation of claim 1, wherein disintegration agent is a member selected from the group consisting of a cross-linked cellulose, a cross-linked PVP, a cross-linked starch, a cross-linked alginic acid, a xanthan gum and a gellan gum.

12. The insecticide formulation of claim 1, wherein the disintegration agent is present in an amount of about 0.5% to 5% w/w.

13. A method for controlling insects, the method comprising: contacting an insect habitat, breeding grounds or their locus with an insecticide formulation of claim 1, wherein the insecticide formulation controls insects.

14. The method for controlling insects of claim 13, wherein the insect is a mosquito.

15. The method for controlling insects of claim 13, wherein the insect habitat is water.

16. The method for controlling insects of claim 13, wherein the insecticide formulation is applied at about 5 lbs to about 10 lbs per/acre.

17. The method for controlling insects of claim 13, wherein the insecticide formulation is applied at about 7.5 lbs per/acre.

18. An insecticide formulation, the insecticide formulation comprising:
   a substrate with a first insecticide bound thereto, wherein the first insecticide is methoprene;

a first layer having a first floating agent, which is perlite and a disintegration agent, which is xanthan gum bound on the substrate with a first insecticide bound thereto, wherein the first floating agent and the disintegration agent are admixed, wherein the substrate has a density greater than 1;

a binding layer comprising a binding agent, the binding layer disposed on the first layer; and a second layer having a second insecticide selected from the group consisting of a genetically modified *Bacillus thuringiensis* (BT) or a genetically modified *Bacillus sphaericus* strain together with the floating agent, which is perlite, wherein the second layer is disposed on the binding agent layer.

\* \* \* \* \*